(12) United States Patent
Montoya et al.

(10) Patent No.: US 11,888,194 B2
(45) Date of Patent: Jan. 30, 2024

(54) METHOD FOR DISTINGUISHING THE CAUSE OF VOLTAGE LOSSES IN A FUEL CELL DEVICE, FUEL CELL DEVICE AND MOTOR VEHICLE HAVING SUCH A DEVICE

(71) Applicant: AUDI AG, Ingolstadt (DE)

(72) Inventors: Oscar Montoya, Ludwigsburg (DE); Kai Müller, Bretzfeld (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/775,853

(22) PCT Filed: Jun. 17, 2021

(86) PCT No.: PCT/EP2021/066390
§ 371 (c)(1),
(2) Date: May 10, 2022

(87) PCT Pub. No.: WO2022/053191
PCT Pub. Date: Mar. 17, 2022

(65) Prior Publication Data
US 2023/0216075 A1    Jul. 6, 2023

(30) Foreign Application Priority Data
Sep. 11, 2020   (DE) .......................... 102020123782.0

(51) Int. Cl.
*H01M 8/04992* (2016.01)
*H01M 8/04537* (2016.01)

(52) U.S. Cl.
CPC ... *H01M 8/04992* (2013.01); *H01M 8/04559* (2013.01); *H01M 2250/20* (2013.01)

(58) Field of Classification Search
CPC ......... H01M 2250/20; H01M 8/04305; H01M 8/04492; H01M 8/04559; H01M 8/04589;
(Continued)

(56) References Cited

U.S. PATENT DOCUMENTS

| 2014/0272652 A1 | 9/2014 | Lebzelter et al. |
| 2016/0164126 A1 | 6/2016 | Cho |
| 2018/0294498 A1* | 10/2018 | Suh .................. H01M 8/04664 |

FOREIGN PATENT DOCUMENTS

| DE | 102012104142 A1 | 12/2012 |
| DE | 102016117432 A1 | 3/2017 |
| WO | 01/99218 A1 | 12/2001 |

OTHER PUBLICATIONS

English translation of Written Opinion of the International Searching Authority, dated Oct. 5, 2021 for International Application No. PCT/EP2021/066390. (5 pages).

* cited by examiner

*Primary Examiner* — Victoria H Lynch
(74) *Attorney, Agent, or Firm* — Seed IP Law Group LLP

(57) ABSTRACT

A method for distinguishing the cause of voltage losses in a fuel cell device includes: a) Detection of a quasi-stationary operation of the fuel cell device, b) Acquisition and storage of a measured current-voltage characteristic curve with the current values and the voltage values of a fuel cells stack of the fuel cell device, c) Use of a PtOx model to determine PtOx voltage losses and calculation of a corrected current-voltage characteristic curve for the PtOx-free and normally humidified fuel cell stack, and d) Comparison of the current-voltage characteristic curves determined in step b) and in step c) and detection of an at least partially dried-out fuel cell stack if the measured current-voltage characteristic curve runs below the corrected current-voltage characteristic curve. A fuel cell device and a motor vehicle comprising a fuel cell device are also provided.

10 Claims, 3 Drawing Sheets

(58) Field of Classification Search
CPC ......... H01M 8/04679; H01M 8/04701; H01M 8/04753; H01M 8/04783; H01M 8/04835; H01M 8/0488; H01M 8/04955; H01M 8/04992; Y02E 60/50
See application file for complete search history.

METHOD FOR DISTINGUISHING THE CAUSE OF VOLTAGE LOSSES IN A FUEL CELL DEVICE, FUEL CELL DEVICE AND MOTOR VEHICLE HAVING SUCH A DEVICE

BACKGROUND

Technical Field

Embodiments of the invention relate to a method for distinguishing the cause of voltage losses in a fuel cell device.

Embodiments of the invention further relate to a fuel cell device and a motor vehicle having a fuel cell device.

Description of the Related Art

Fuel cell devices are used for the chemical conversion of an oxygen-containing fuel to water in order to generate electrical energy. For this purpose, fuel cells contain the so-called membrane electrode unit as the core component, which is a composite of one proton-conducting membrane and in each case one electrode arranged on both sides of the membrane, namely the anode and the cathode. The anode and the cathode are coated with a catalyst layer of a noble metal or a mixture comprising noble metals such as platinum, palladium, ruthenium or the like arranged on a carbon support, which serve as reaction accelerators in the reaction of the respective fuel cell.

In the operation of the fuel cell device having a plurality of fuel cells combined to form a fuel cell stack, the fuel, in particular hydrogen ($H_2$) or a hydrogen-containing gas mixture, is supplied to the anode, where electrochemical oxidation of $H_2$ to $H^+$, with the release of electrons, takes place. The $H^+$ protons are transported from the anode compartment to the cathode compartment via the membrane, which membrane separates the reaction compartments in a gas-tight manner and electrically insulates them. The electrons provided at the anode are supplied to the cathode via an electrical line. Oxygen or an oxygen-containing gas mixture is supplied to the cathode, so that a reduction of $O_2$ to $O^{2-}$ takes place with absorption of the electrons. At the same time, in the cathode chamber, these oxygen anions react with the protons transported via the membrane to form water. This water must be conveyed out of the fuel cell and the fuel cell stack until a humidity level that is required for operation of the fuel cell device is reached.

In order to provide sufficient oxygen from the air for the plurality of fuel cells combined in a fuel cell stack, air with the oxygen contained therein is compressed by means of a compressor in the cathode circuit to supply the cathode chambers of the fuel cell stack, in such a way that relatively warm and dry compressed air is present, the humidity of which is not sufficient to ensure the humidity level in the fuel cell stack for the membrane electrode unit. It is for this reason that a humidifier is used, which, in the case of two gaseous media having different humidity contents, causes a transfer of humidity to the drier medium by passing the dry air provided by the compressor past a humidifier membrane permeable to water vapor, the other side of which membrane is coated with the moist exhaust air from the fuel cell stack.

Fuel cells are subject to aging over the course of their service life. This aging has a reversible and an irreversible part and is described by the decrease of the voltage in a voltage-current characteristic curve (I/V curve) while a given current is drawn from the fuel cell. Thus, at the beginning of the service life of the fuel cell, the voltage drop at the respective current is lower than at a more advanced stage in the service life. Since the aging of the fuel cell has a reversible component, the fuel cell can be regenerated and thus the efficiency of the fuel cell can be increased again.

A major cause of degradation is the dissolution of the platinum catalyst due to oxide development when the fuel cell is operated at high cell voltage. The dissolution of the platinum catalyst is, in particular, accelerated when the membrane electrode unit is operated in cycling operation at the upper voltage limit. This is the case, for example, when the fuel cell is idle (also known as OCV operation, where OCV means "open circuit voltage") or during frost startup. The dissolution of the platinum catalyst leads to a decrease in the catalytically active surface, which means that the fuel cell is subject to accelerated aging.

The drop in voltage can therefore be attributed, among other things, to unwanted catalyst loading, for example, by platinum oxide species. These oxide species form on the cathode during operation and are voltage driven, which is to say, that their development and degradation is a function of the cathode half-cell voltage and thus a function of the cell voltage. This development process cannot be prevented and is part of ordinary operation. The stronger the loading of PtOx, the greater the voltage losses. The voltage loss has a logarithmic behavior over time, which is to say, the greatest change in voltage occurs in the first few seconds, after which the voltage changes only slowly and gradually. The cell voltage also has a decisive influence on these voltage losses, which leads to a pronounced load point dependence. PtOx conversion processes take place during changes in load point—a change to a higher voltage develops more PtOx, a change to a lower voltage partially degrades PtOx. The development and degradation process is thus never complete, but rather seeks, over time, to achieve once again a new electrochemical equilibrium on a logarithmic basis. A change to a high load point and consequently a lower stack voltage can also be interpreted as regeneration since part of the unwanted oxide loading is degraded.

A further reversible part of the degradation of the fuel cell or the plurality of fuel cells combined to form a fuel cell stack occurs when the fuel cell or the fuel cell stack is operated with an insufficient level of humidity, which is to say, when it is too dry. This is usually caused by operation at high temperatures and high loads, which is to say, high power consumption. Drying out leads to a reduction in efficiency and thus to higher consumption of fuel.

DE 10 2012 104 142 A1 describes a method for determining when to perform a recovery process to recover a reversible voltage loss, wherein an estimate of an irreversible voltage loss is taken into consideration, in order to detect a difference between the estimated irreversible voltage loss and an estimated current stack voltage. DE 10 2016 117 432 A1 similarly references a method for determining a recoverable voltage loss based on a comparison between the estimated output voltage and a measured output voltage. A recovery process is started if a sufficient magnitude of the recoverable voltage loss occurs. The monitoring of the humidity of a fuel cell stack is described in US 2016/0164126 A1.

Since different mechanisms exist that lead to reversible degradation and different actions are required to exploit the reversibility of the mechanisms, it is important to distinguish what is causing a detected performance degradation in order to trigger an appropriate recovery strategy that will lead to the recovery of the normal achievable performance of the fuel cell or fuel cell stack.

BRIEF SUMMARY

Some embodiments provide a method for distinguishing between a drying out of fuel cells and catalyst poisoning or alternatively voltage loss on the basis of a buildup of PtOx. Some embodiments provide an improved fuel cell device and an improved motor vehicle.

The method mentioned at the beginning is characterized in that different contributions to the degradation can be distinguished in a simple manner and in this way an adapted recovery strategy can also be applied, namely when a humidification is carried out as a recovery strategy if an at least partially dried-out fuel cell stack is detected in step d). Unnecessary forced stops with a restart are thus avoided, and the availability of the fuel cell device increases. The consumption of fuel also decreases since the fuel cell stack is operated more often in an optimal state with higher efficiency. In addition, the irreversible part of the degradation decreases since the fuel cell stack is more often operated in an optimal state.

It may be further advantageous if steps a) to d) are performed again to check whether the humidification has eliminated the voltage loss. If this is the case, then the diagnosis of the degradation was correct, otherwise another mechanism for the degradation such as impurities with CO, $NH_3$ must be included in the considerations.

The selection of an optimized recovery strategy is also aided by the fact that the measured current values and voltage values acquired in step b) are classified and assigned to SOH containers, as this allows the recovery strategy to be selected as a function of the SOH container present.

It has proven to be useful if, in the case of a drying-indexed regeneration of the fuel cell stack, the average membrane temperature is changed and/or the cathode-side inlet humidity is increased and/or the cathode-side inlet pressure is increased and/or a change in the air stoichiometry occurs.

If the application of the PtOx model results in the need for regeneration due to PtOx poisoning, it has proven useful if the electrical voltage of the fuel cell stack is lowered below 300 mV.

It is also possible that a stop of the fuel cell device can be requested to electrically discharge the fuel cell stack to reduce the PtOx and also facilitate humidification.

The advantages and effects mentioned here above apply, mutatis mutandis, to a fuel cell device having a control unit arranged to perform the foregoing procedures and to a motor vehicle having such a fuel cell device.

The features and combinations of features mentioned above in the description, as well as the features and combinations of features mentioned below in the description of the figures and/or shown alone in the figures, can be used not only in the combination indicated in each case, but also in other combinations or on their own. Therefore, embodiments which are not explicitly shown or explained in the figures are also to be deemed to be encompassed and disclosed if they arise from the explained embodiments and can be generated by separate combinations of features.

BRIEF DESCRIPTION OF THE SEVERAL VIEWS OF THE DRAWINGS

Further advantages, features and details will be apparent from the claims, from the following description and from the drawings.

DETAILED DESCRIPTION

Figure 1:
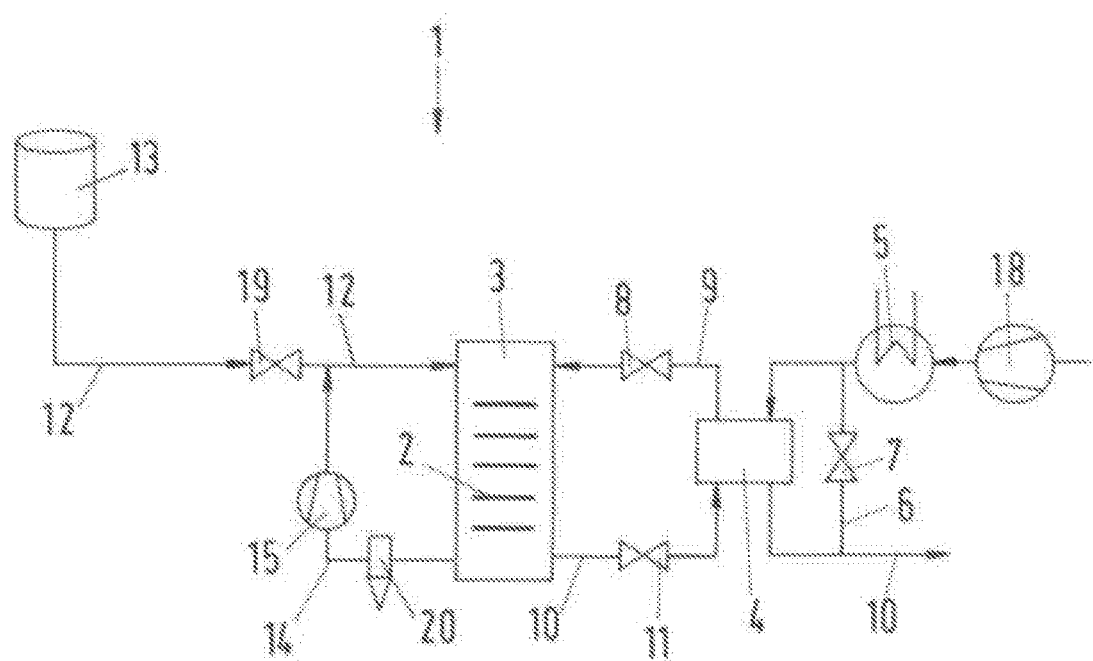
FIG. 1 shows a schematic representation of a fuel cell device.

FIG. 1 schematically shows a fuel cell device 1, wherein the same comprises a plurality of fuel cells 2 combined in a fuel cell stack 3.

Each of the fuel cells 2 comprises an anode, a cathode as well as a proton-conducting membrane separating the anode from the cathode. The membrane is formed from an ionomer, such as a sulfonated polytetrafluoroethylene polymer (PTFE) or a polymer of perfluorinated sulfonic acid (PFSA). Alternatively, the membrane may be formed as a sulfonated hydrocarbon membrane.

A catalyst is mixed with the anodes and/or the cathodes, wherein the membranes may be coated on their first side and/or on their second side with a catalyst layer of a noble metal or a mixture comprising noble metals such as platinum, palladium, ruthenium or the like, which serve as reaction accelerators in the reaction of the respective fuel cell 2.

Fuel (for example hydrogen) can be supplied to the anode from a fuel tank 13 via an anode compartment. In a polymer electrolyte membrane fuel cell (PEM fuel cell), fuel or fuel molecules are split into protons and electrons at the anode. The PEM allows the protons to pass through but is impermeable to the electrons. The reaction: $2H_2 \rightarrow 4H^+ + 4e^-$ (oxidation/electron release), for example, occurs at the anode. Whereas the protons pass through the PEM to the cathode, the electrons are directed to the cathode or to an energy storage device via an external circuit.

The cathode fresh gas (for example, oxygen or oxygen-containing air) can be supplied to the cathode via a cathode compartment, so that the following reaction occurs on the cathode side: $O_2 + 4H^+ + 4e^- \rightarrow 2H_2O$ (reduction/electron capture).

Since several fuel cells 2 are combined together in the fuel cell stack 3, a sufficiently large quantity of cathode fresh gas must be made available, so that a large cathode gas mass flow or fresh gas flow is provided by a compressor 18, wherein as a result of the compression of the cathode fresh gas, its temperature is considerably increased. The conditioning of the fresh cathode gas or the fresh air gas flow, which is to say, its adjustment with respect to the temperature and humidity desired in the fuel cell stack 3, is carried out in a humidifier 4, which effects optimum humidification of the membranes of the fuel cells 2 for the purpose of increasing their efficiency, since this favors proton transport.

During operation of the fuel cell device 1, catalyst poisoning occurs due to oxide formation, which limits the performance and efficiency of the fuel cell device 1. This degradation is reversible and the implementation of a procedure for the regeneration of the fuel cell device 1 is possible, which is exploited to limit or eliminate the voltage losses. Indeed, if a reduction of the cell voltage occurs, for example, due to an increased current draw at high load points, PtOx is degraded. The higher this load point, the stronger the regenerative effect. In an ideal case, the load current is so high that each fuel cell in the fuel cell system reaches a voltage below 0.5V (ideally below 0.4V) and thereby, at said moment the catalyst is free of PtOx, which corresponds to the maximum regenerative effect. Alternatively, a stop command can be sent to a start/stop coordinator to discharge the fuel cell device 1 during this process.

A limitation of the efficiency and performance of the fuel cell device may also be brought about by a drying out of the fuel cell stack 3, which is reversible by appropriate enhanced humidification by means of the humidifier 4. Voltage losses can also occur due to impurities. All of this presents difficulties in distinguishing what is causing the degradation and how it can be eliminated by a suitable recovery strategy. The aging of the fuel cell stack is described by the State of Health (SOH).

Therefore, to distinguish the cause of voltage losses in a fuel cell device 1, a procedure is performed that includes the steps:

a) Detection of a quasi-stationary operation of the fuel cell device 1,
b) Acquisition and storage of a measured current-voltage characteristic curve 16 with the current values and the voltage values of a fuel cell stack 3 of the fuel cell device 1,
c) Use of a platinum oxide (PtOx) model 17 to determine PtOx voltage losses and calculation of a corrected current-voltage characteristic curve 21 for the PtOx-free and normally humidified fuel cell stack 3,
d) Comparison of the current-voltage characteristic curves 16, 21 determined in step b) and in step c) and detection of an at least partially dried-out fuel cell stack 3 if the measured current-voltage characteristic curve 16 runs below the corrected current-voltage characteristic curve 21.

Figure 2:
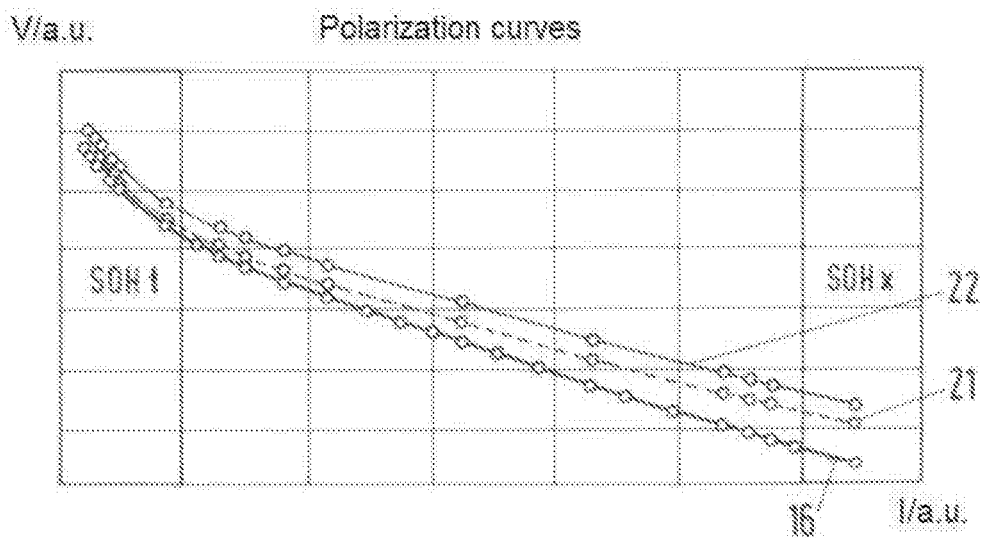
FIG. 2 shows a representation of three different current-voltage characteristic curves, namely the characteristic curve for a PtOx-free catalyst (thin solid line), a characteristic curve corrected according to a model for PtOx formation (dashed line) and a measured characteristic curve (thick solid line).

FIG. 2 shows three different current-voltage characteristic curves, namely the characteristic curve 22 for a PtOx-free catalyst (thin solid line), a characteristic curve 21 corrected according to a model for PtOx creation (dashed line) and a measured characteristic curve 16 (thicker solid line). If, based on the measured characteristic curve 16, a characteristic curve 21 corrected on the basis of the PtOx model does not show the expected characteristic curve for a PtOx-free catalyst, then an additional degradation mechanism is present, which is assumed to be due to insufficient humidification. The corresponding sequence is shown in the flow chart of FIG. 3. If a dried-out fuel cell stack 3 is suspected, then humidification is performed as a recovery strategy.

Figure 3:
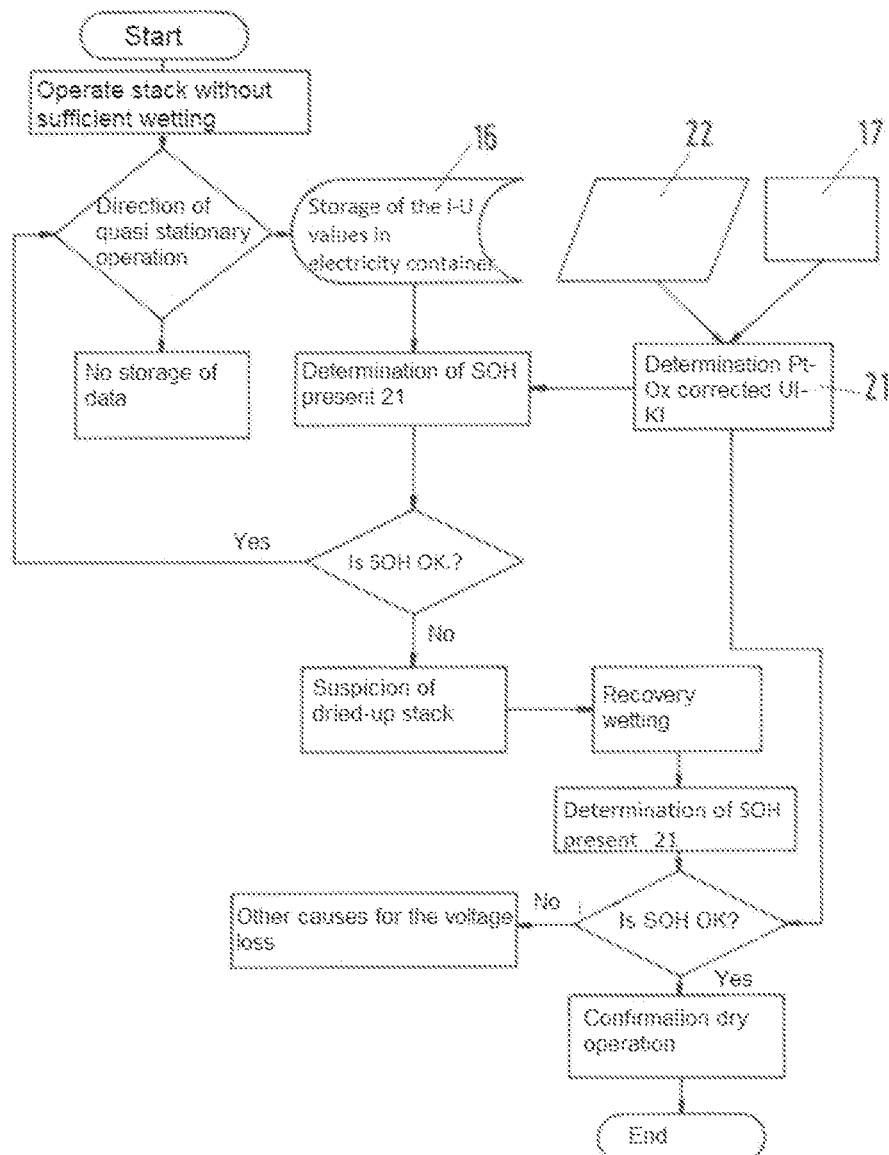
FIG. 3 shows a flow chart for determining whether a dried-out fuel cell stack is present.

If the renewed execution of steps a) to d) shows that the humidification has eliminated the voltage losses, which is to say, that the measured current-voltage characteristic curve 16 essentially coincides with the corrected current-voltage characteristic curve 21, it is then confirmed that the diagnosis of the operation of the fuel cell stack 3 in dried-out state was correct (FIG. 3).

To facilitate the selection of an appropriate recovery strategy, the measured current and voltage values collected in step b) are classified and assigned to SOH containers.

Figure 4:
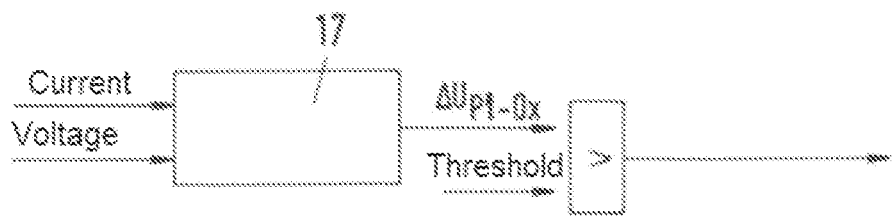
FIG. 4 shows a representation of a PtOx development model, with which voltage losses are estimated, in order to trigger a PtOx regeneration; furthermore, these voltage losses are considered in order to determine the corrected characteristic curve of the PtOx formation.

FIG. 4 shows the process for using the PtOx model 17, in which the current values and the voltage values are supplied as input variables to the PtOx model 17, which determines the formation of PtOx under the given operating conditions and calculates the expected voltage drop. If this exceeds a predetermined or predefinable value, a PtOx regeneration can be initiated.

In a drying-indexed regeneration of the fuel cell stack 3, a change in the average membrane temperature and/or an increase in the cathode-side inlet humidity and/or an increase in the cathode-side inlet pressure and/or a change in the air stoichiometry occurs, whereas the electrical voltage of the fuel cell stack 3 is lowered below 300 mV if degradation due to PtOx poisoning is present. Additionally, a stop of the fuel cell device 1 can also be requested.

This fuel cell device 1, comprising a control device suitable for carrying out the method, ensures the long-lasting performance of said control device with good efficiency in the case of a motor vehicle.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for distinguishing a cause of voltage losses in a fuel cell device, comprising:
   detecting a quasi-stationary operation of the fuel cell device;
   acquiring and storing a measured current-voltage characteristic curve with current values and voltage values of a fuel cell stack of the fuel cell device;
   using a PtOx model to determine PtOx voltage losses and calculating a corrected current-voltage characteristic curve for the PtOx-free and normally humidified fuel cell stack; and
   comparing the measured and corrected current-voltage characteristic curves and detecting an at least partially dried-out fuel cell stack if the measured current-voltage characteristic curve runs below the corrected current-voltage characteristic curve.

2. The method of claim 1, further comprising, after detecting an at least partially dried-out fuel cell stack, performing humidification as a recovery strategy.

3. The method according to claim 2, further comprising, after performing humidification, to verify whether the humidification has eliminated a current loss:
   detecting a quasi-stationary operation of the fuel cell device;
   acquiring and storing a measured current-voltage characteristic curve with current values and voltage values of a fuel cell stack of the fuel cell device;
   using a PtOx model to determine PtOx voltage losses and calculating a corrected current-voltage characteristic curve for the PtOx-free and normally humidified fuel cell stack; and
   comparing the measured and corrected current-voltage characteristic curves and detecting an at least partially dried-out fuel cell stack if the measured current-voltage characteristic curve runs below the corrected current-voltage characteristic curve.

4. The method according to claim 1, wherein the measured current values and voltage values are classified and assigned to SOH containers.

5. The method according to claim 4, wherein a recovery strategy is selected depending on an SOH container at hand.

6. The method according to claim 1, wherein, during a drying-indexed regeneration of the fuel cell stack, a change in an average membrane temperature and/or an increase in a cathode-side inlet humidity and/or an increase in a cathode-side inlet pressure and/or a change in the air stoichiometry occurs.

7. The method according to claim 1, wherein an electrical voltage of the fuel cell stack is lowered below 300 mV.

8. The method according to claim 1, wherein a stop of the fuel cell device is requested.

9. A fuel cell device comprising a control unit which is designed to perform a method for distinguishing a cause of voltage losses in the fuel cell device, the method comprising:
   detecting a quasi-stationary operation of the fuel cell device;
   acquiring and storing a measured current-voltage characteristic curve with current values and voltage values of a fuel cell stack of the fuel cell device;
   using a PtOx model to determine PtOx voltage losses and calculating corrected current-voltage characteristic curve for the PtOx-free and normally humidified fuel cell stack; and
   comparing the measured and corrected current-voltage characteristic curves and detecting an at least partially dried-out fuel cell stack if the measured current-voltage characteristic curve runs below the corrected current-voltage characteristic curve.

10. A motor vehicle with a fuel cell device according to claim 9.

* * * * *